United States Patent [19]

Kuzniarski et al.

[11] Patent Number: 5,553,466
[45] Date of Patent: Sep. 10, 1996

[54] REFRIGERATION APPARATUS

[75] Inventors: John N. S. Kuzniarski, Hampshire; Peter F. Goodall, Forest Row; Brian King, Godalming, all of England

[73] Assignee: The BOC Group plc, Windlesham, England

[21] Appl. No.: 183,555

[22] Filed: Jan. 19, 1994

[30] Foreign Application Priority Data

Jan. 22, 1993 [GB] United Kingdom ............... 9301235

[51] Int. Cl.$^6$ ............................................. F25J 1/00
[52] U.S. Cl. ................................. 62/602; 62/911
[58] Field of Search ............................... 62/10, 35

[56] References Cited

U.S. PATENT DOCUMENTS 4,004,732  10/1975  Hanson ................................. 239/2
4,377,402   3/1983  Crowe et al. ........................ 62/10
5,154,348  10/1992  Ratnik et al. ..................... 239/14.2
5,259,199  11/1993  Franklin ............................. 62/10

FOREIGN PATENT DOCUMENTS 0034930  9/1981  European Pat. Off. ..
0246179  11/1987  European Pat. Off. ..
9208936   5/1992  WIPO .

Primary Examiner—Ronald C. Capossela
Attorney, Agent, or Firm—R. Hain Swope; David A. Draegert

[57] ABSTRACT

An apparatus for depositing solid carbon dioxide on items to be refrigerated comprises a device (10) operable to convert a stream of liquid carbon dioxide into a forward flow of gaseous carbon dioxide containing entrained particles of solid carbon dioxide, a carriage (8) upon which said device (10) is mounted for translating in opposite directions and means for moving said device so as to direct said stream towards a plurality of individual items to be refrigerated.

4 Claims, 2 Drawing Sheets

REFRIGERATION APPARATUS

BACKGROUND OF THE INVENTION

This invention relates to refrigeration apparatus. In particular, it relates to apparatus for depositing solid carbon dioxide on items to be refrigerated.

It is desirable to store perishable foodstuffs and other items in a chilled environment prior to their human consumption. In for example handling pre-packed meals before they are loaded onto an aircraft, the meals are taken out of a refrigerated chamber and placed in an unrefrigerated cart on the ground ready for loading onto the aircraft. On occasions, particularly if there are delays to the aircraft taking off, this procedure may result in the meals being held outside a refrigerated environment for too long a period of time to be acceptable.

It is well known that if a stream of liquid carbon dioxide at a pressure and temperature above its triple point is caused to undergo a reduction in pressure, to below the triple point pressure, the stream of liquid carbon dioxide is convened to a mixture of gas and solid carbon dioxide particles, the latter often being referred to carbon dioxide snow. Accordingly, a simple device, often referred to as a "snow horn", including a nozzle for reducing the pressure of a liquid carbon dioxide stream such that it is convened into solid carbon dioxide and gaseous carbon dioxide, and a chamber in communication with the nozzle and having an open downstream end may be used to project solid carbon dioxide at items to be refrigerated. Such a snow horn has been used to project solid carbon dioxide onto pre-packaged meals before these meals are loaded onto an aircraft in order to provide refrigeration for these meals. The practice has been for the meals to be loaded onto the shelves of a cart having doors at either end and then for a hand-held snow horn to be used to spray solid carbon dioxide particles onto the packages through one pair of doors and then through the other. It is however difficult to obtain a relatively uniform distribution of the solid carbon dioxide snow by such a method. The invention aims at providing an apparatus that ameliorates this difficulty.

SUMMARY OF THE INVENTION

According to the present invention there is provided apparatus for depositing solid carbon dioxide on items to be refrigerated, comprising a device operable to convert a stream of liquid carbon dioxide into a forward flow of gaseous carbon dioxide containing entrained particles of solid carbon dioxide, a carriage, said device being mounted on the carriage, a guide along which the carriage is able to be translated in opposite directions, and means for translating the carriage along the guide.

Any convenient means may be provided for translating the carriage along the guide. For example, the means may comprise a pneumatic cylinder and piston, movement of the piston causing translation of the carriage. Preferably, the piston is double acting.

In the example of projecting solid carbon dioxide onto packaged meals in a cart, the guide preferably comprises a vertical rail, and the carriage is preferably adapted to hold the device generally horizontally.

An apparatus according to the invention will now be described by way of example with reference to the accompanying drawings.

DESCRIPTION OF THE PREFERRED EMBODIMENTS

The drawings are not to scale.

Figure 1:
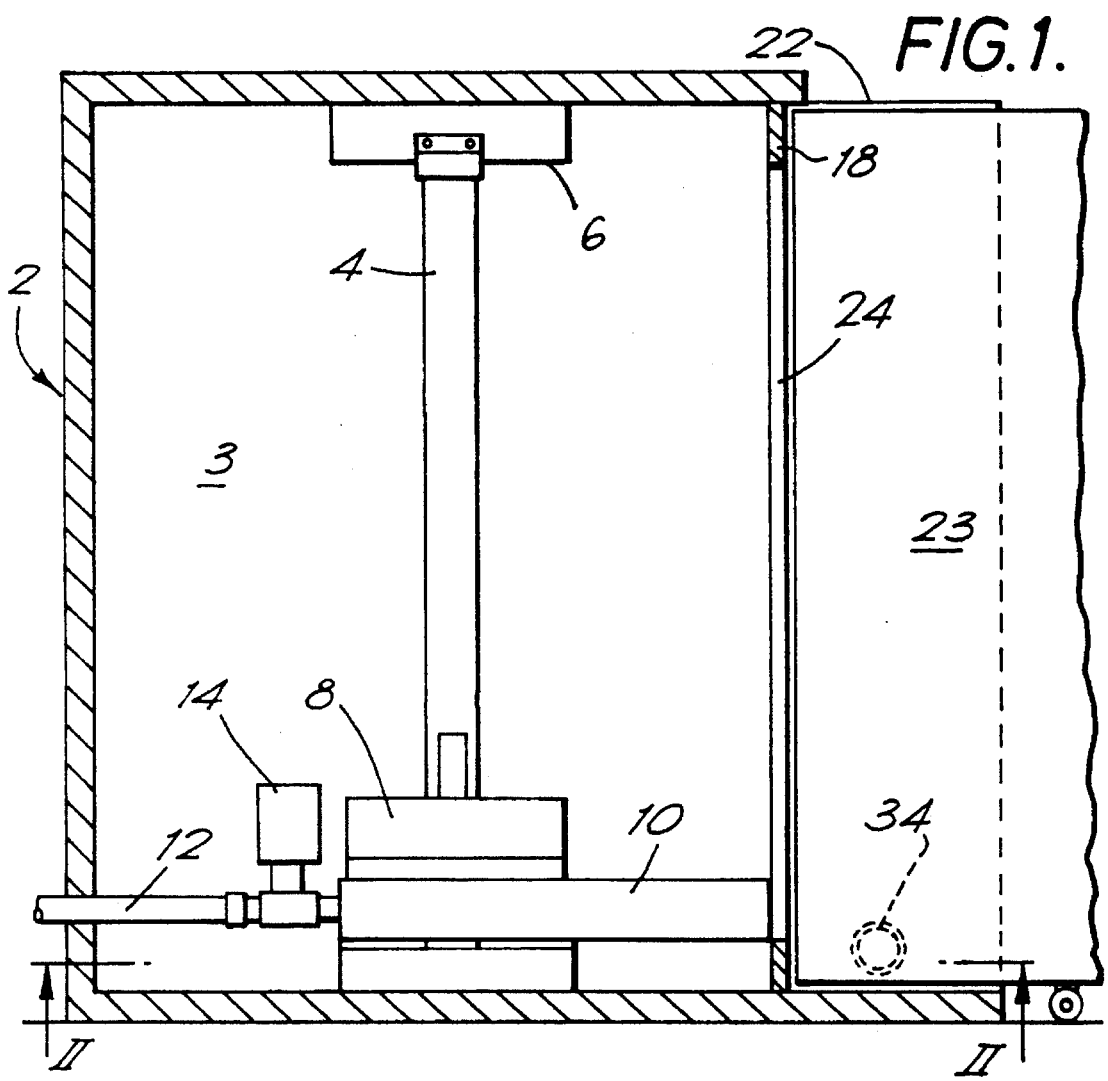
FIG. 1 is a schematic side elevation of an apparatus for projecting solid carbon dioxide onto items to be refrigerated.
Figure 2:
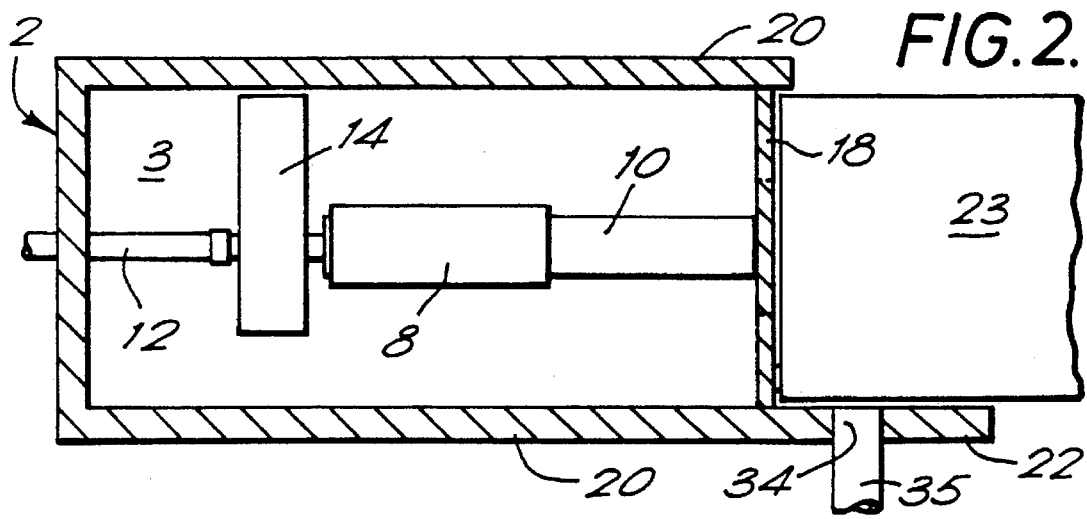
FIG. 2 is a schematic section through the line II—II in FIG. 1.
Figure 3:
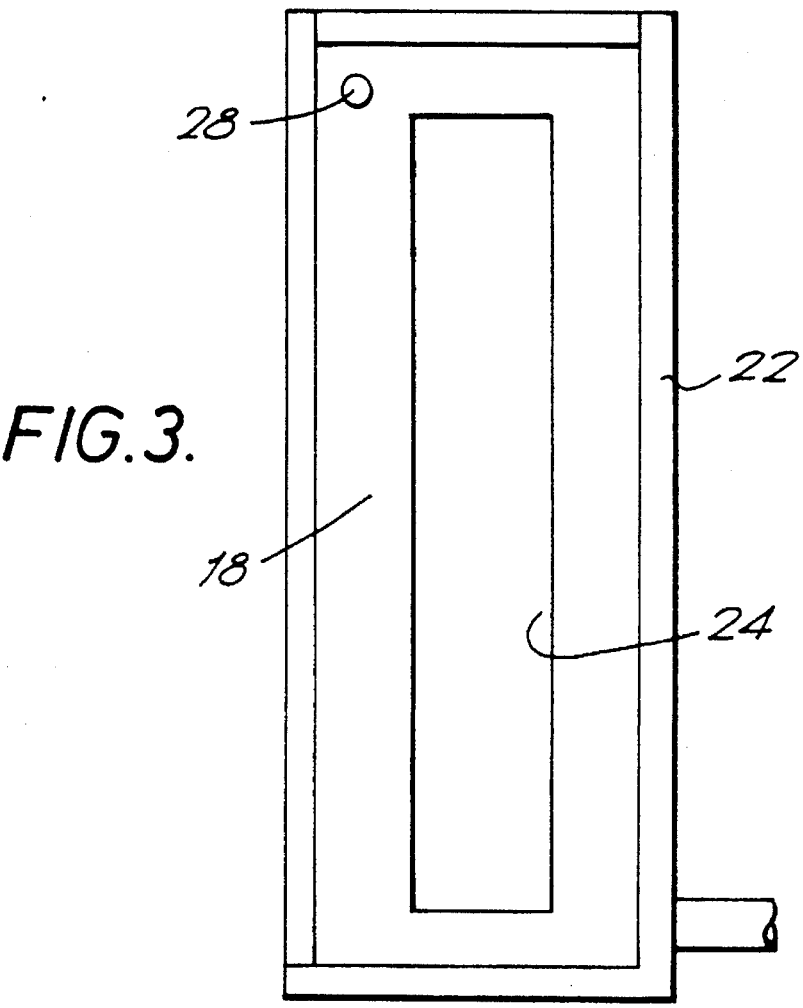
FIG. 3 is a schematic front elevation of the apparatus shown in FIGS. 1 and 2.

Referring to FIGS. 1 to 3 of the drawings, the illustrated apparatus includes a generally cuboidal housing or casing 2 defining a chamber 3. A vertical guide rail 4 is located within the chamber 3. Supports 6, one of which is shown in FIG. 1, are used to hold the guide rail 4 in position. A carriage 8 is adapted to be moved upwardly and downwardly along the rail 4. A pneumatic piston and cylinder arrangement (not shown in the drawings) may be used for this purpose. In one possible arrangement, the guide rail 4 can be constructed around a suitable pneumatic cylinder. The cylinder may be double-acting and communicate with a first valved conduit (not shown) for the supply of compressed air, which, when open, permits air to flow from the first conduit to cause the down stroke of the piston to take place, and with a second valved conduit (not shown) for the supply of compressed air, which, when open, permits air to flow from the second conduit to cause the piston (not shown) to make its up stroke. Alternative arrangements are possible. For example, an equivalent hydraulic arrangement may be used. In another alternative, the carriage may be motor-driven.

A device for forming solid carbon dioxide from liquid carbon dioxide in the form of a snow horn 10 is mounted on the carriage. The arrangement is such that the longitudinal axis of the snow horn 10 is horizontal with the mouth of the horn 10 facing forwardly. The snow horn 10 is connected at its rearward end to a hose 12 which is able to be connected to a source (not shown) of liquid carbon dioxide under pressure. The rearward end of the snow horn 10 is also provided with an on-off valve 14 which may be manually or automatically opened to enable liquid carbon dioxide to flow to the snow horn 10 and manually or automatically closed to stop such flow. The forward end of the snow horn 10 terminates just short of the front wall 18 of the casing 2. The front wall 18 is set back relative to a forward end 22 of one of the side walls 20 of the casing 2. In operation, a cart 23 containing pre-packaged meals may be located against the forward end 22 and the front wall 18.

The front wall 18 of the casing 2 is formed with a vertical slot 24 therethrough. The extent and position of the slot 24 is such that solid carbon dioxide is able to pass from the forward end of the snow horn 10 therethrough without being impeded in any manner. Preferably, the apparatus shown in FIGS. 1 to 3 of the drawings is adapted to operate automatically. For example, an actuator 28 may project from the forward side of the wall 18 such that it can be engaged by the cart 23. On being engaged, the actuator is able to generate signals which initiate opening of the valve 14 and supply of compressed air to the pneumatic cylinder (not shown). Liquid carbon dioxide thus flows into the snow horn 10 and is converted into a mixture of gaseous and solid carbon dioxide that flows out of the forward end of the snow horn 10 and passes through the slot 24 in the front wall 18 of the casing 2. The snow horn 10 is arranged to project the solid carbon dioxide over the full length of the interior of the cart (typically a distance in the order of 1 to 2 m). There is a tendency, in operation, for accumulating gaseous carbon dioxide to return backwards into the chamber 3. The wall 18 functions as a baffle in order to limit this tendency. In addition, gaseous carbon dioxide can be led away through an outlet 34 in a bottom region of the forward end 22 of one of the side walls 20. The outlet 34 communicates with ducting 35 which is able to lead the gaseous carbon dioxide away from the immediate vicinity of the apparatus according to the invention to a location where the carbon dioxide can be safely vented. If desired, this venting of gaseous carbon dioxide may be assisted by a fan (not shown).

Figure 4:
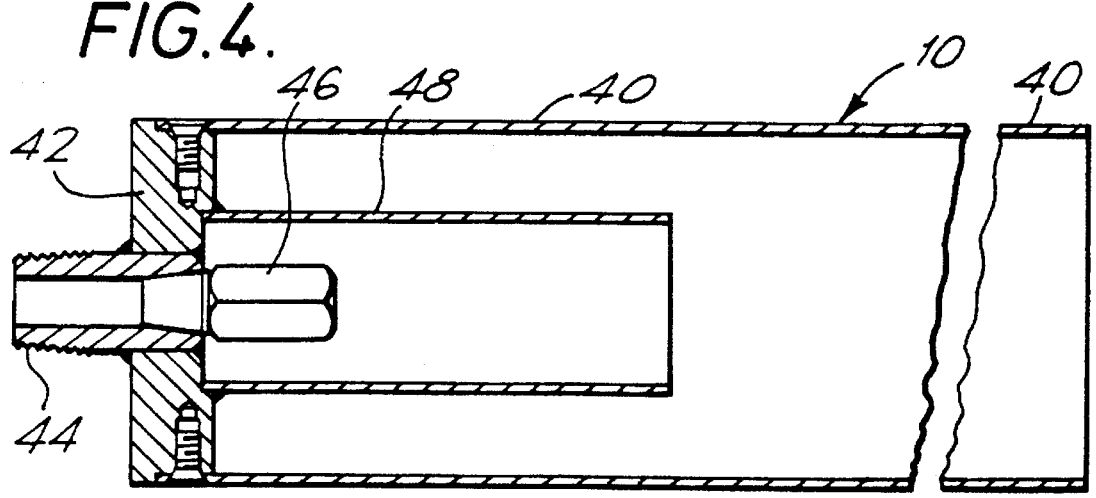
FIG. 4 is a schematic side elevation, partly in section, of a carbon dioxide snow forming device for use in the apparatus shown in FIGS. 1 to 3.

Referring now to FIG. 4, there is shown one form of snow horn 10 for use in the apparatus shown in FIGS. 1 to 3. The snow horn 10 comprises a hollow cylindrical sleeve 40. The rearward end of the sleeve has an end cap 42 mounted in it and secured fluid tight thereto. The end cap 42 receives a nozzle holder 44 which is co-axial with the sleeve 40. A nozzle 46 extends from the nozzle holder 44 into the interior of the sleeve 40. A shroud 48 in the form of a hollow cylindrical member is located within the sleeve 40 circumjacently to the nozzle 46. The shroud 48 extends co-axially to the sleeve 40. One end of the shroud 48 is secured to the end cap 42 and the other end terminates forwardly of the nozzle 46. In operation, the shroud 48 helps to limit divergence of the stream of gaseous carbon dioxide containing entrained particles of solid carbon dioxide snow that issues from the nozzle 46. This arrangement helps to limit the angle at which the gas stream diverges on leaving the forward end of the sleeve 40. The diameter of the sleeve 40 at its forward end has a diameter greater than the vertical distance between adjacent shelves in the cart.

If desired, the forward end of the sleeve 40 may diverge (in a horizontal plane) and may define an elongate, generally horizontal outlet so as to facilitate discharge of carbon dioxide from the forward end of the sleeve 40 in a divergent stream. If desired, the apparatus may be provided with a set of readily demountable sleeves 40 (or forward ends thereof) and the appropriate sleeve or end chosen according to the dimensions of the interior of the cart.

Referring again to FIGS. 1 to 3 of the drawings, in operation, the snow horn 10 may typically take from 15 to 30 seconds to travel from the bottom to the top of the rail 4. Throughout the travel of the snow horn 10, liquid carbon dioxide is supplied continuously to it and is converted to a stream of gaseous carbon dioxide containing entrained particles of solid carbon dioxide. If desired, the pneumatic cylinder (not shown) may be arranged such as to permit the snow horn 10 to dwell for a second or two en route from the top to the bottom of the guide rail 4. The controls for the apparatus may be arranged such that when the snow horn 10 reaches the bottom of its travel, the valve 14 is closed. The cart 23 may then be wheeled away from the apparatus and another cart 23 brought into a position such that it engages the actuator 26. The valve 14 is then opened again and the carriage 8 and the snow horn 10 are caused to move up the rail 6. The duration of the upward travel is the same as that of the upward travel, with the same dwell time in the course of the travel.

In a typical operation of the apparatus, liquid carbon dioxide is supplied to the snow horn 10 at a rate of 10 kg/minute and solid carbon dioxide snow is formed at a rate of 4.6 kg/minute. With a travel time of 15 seconds from top to bottom of the guide rail 6 and vice versa, 1.15 kg of solid carbon dioxide are able to be distributed relatively uniformly over packages within the cart.

The apparatus according to the invention may have means for selecting the speed of translation of the carriage. In preferred embodiments, the selecting means is adapted to enable the said speed of translation to be selected automatically in accordance with sensed ambient temperature such that, for example, a higher speed can be selected if the sensed temperature is below a first chosen temperature and a lower speed can be selected if the sensed temperature is above a second chosen temperature. The second chosen temperature may be the same as or greater than the first chosen temperature. Such an arrangement enables more carbon dioxide snow to be deposited at higher than at lower ambient temperatures and thus makes it possible automatically to vary at least to some extent the refrigeration in line with the different needs resulting from different ambient temperatures.

In the apparatus illustrated in the accompanying drawings, there may be a pneumatic or other control system (not shown) which enables such adjustment of the speed of travel of the carriage 8 to be set according to the sensed temperature, for example, a temperature sensor (not shown) may transmit a signal to a valve controller (not shown) and the valve controller in response causes solenoid valves controlling the release of air from a pneumatic cylinder (not shown), which effects the translation of the carriage 8, to operate such that the carriage moves at a chosen velocity.

We claim:

1. Apparatus for depositing solid carbon dioxide on items to be refrigerated, comprising a source of liquid carbon dioxide, conversion means operatively connected to the source of liquid carbon dioxide for converting a stream of the liquid carbon dioxide into a forward flow of gaseous carbon dioxide containing entrained particles of solid carbon dioxide, a movable carriage for supporting the conversion means mounted thereon, guide means for enabling the carriage to be translated in opposite directions, and translating means for translating the carriage along the guide means.

2. Apparatus as claimed in claim 1, in which the translating means comprises a pneumatic cylinder and piston, movement of the piston causing translation of the carriage.

3. Apparatus as claimed in claim 1, in which the guide means comprises a vertical rail.

4. Apparatus as claimed in claim 3, in which the conversion means is mounted in a horizontal position on the carriage.

* * * * *